No. 787,826. PATENTED APR. 18, 1905.
G. L. BRUCE.
DENTAL FLASK.
APPLICATION FILED DEC. 21, 1904
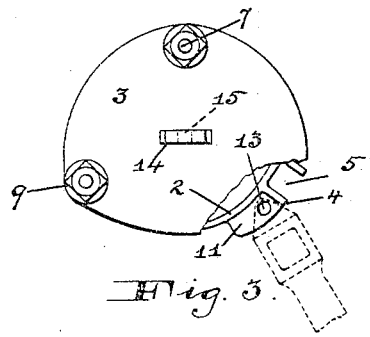
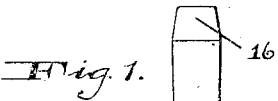
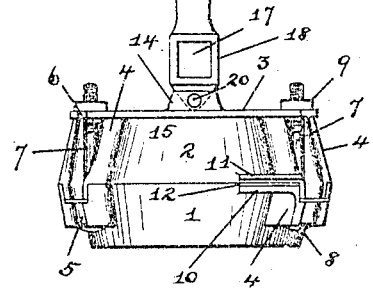
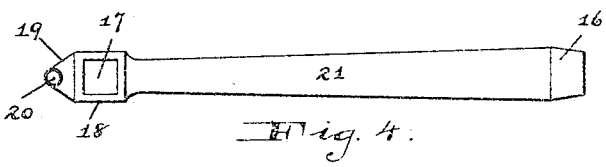
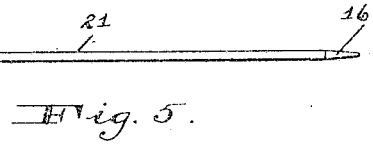
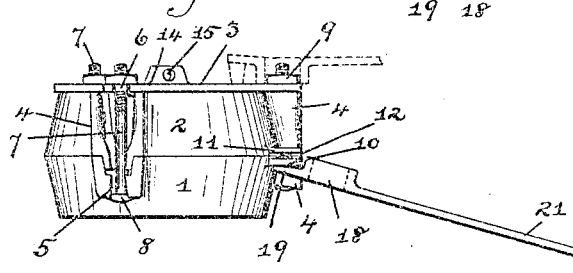
Witnesses.
J. H. Sirich Jr.
D. H. Vogt.
Inventor.
George L. Bruce
By Mann & Co,
Attorneys.

No. 787,826.

Patented April 18, 1905.

UNITED STATES PATENT OFFICE.

GEORGE L. BRUCE, OF BALTIMORE, MARYLAND, ASSIGNOR TO FERDINAND GROSHANS, OF BALTIMORE, MARYLAND.

DENTAL FLASK.

SPECIFICATION forming part of Letters Patent No. 787,826, dated April 18, 1905.

Application filed December 21, 1904. Serial No. 237,745.

*To all whom it may concern:*

Be it known that I, GEORGE L. BRUCE, a citizen of the United States, residing at Baltimore, in the State of Maryland, have invented certain new and useful Improvements in Dental Flasks, of which the following is a specification.

This invention relates to improvements in dental flasks.

In the practical use of dental flasks considerable trouble is experienced in handling the flask and the parts or sections while they are hot. For example, in the preliminary heating to which these flasks are subjected when investing the flask it is necessary to handle the flask and to tighten the nuts on the bolts. Then the flask must be removed from the vulcanizer and the nuts and bolts freed to enable the flask parts or sections to be separated. These handlings are rendered troublesome because of the liability of burning the hands on account of the heated condition of the parts; and my invention therefore has for its object to provide the flask parts with means and also to provide a tool to coact with said means whereby the flask and parts may be handled with ease without liability of burning the hands.

The invention is illustrated in the accompanying drawings, in which—

Figure 1 illustrates a side elevation of a dental flask provided with the improved features and shows the tool from which the flask may be suspended to put the flask within or remove it from the vulcanizer. Fig. 2 is a similar view of the flask with one tool engaging the lower section in order to hold the flask in a horizontal position, while another tool (shown in broken lines) may be used to loosen the nuts on the securing-bolts and lift the flask parts. Fig. 3 illustrates a top plan view of the flask with a portion of the cover broken away to more clearly show the perforated side lug on the upper flask-section and also shows the tool in broken lines; and Figs. 4 and 5 illustrate plan and side elevations, respectively, of the tool.

The flask shown in the present instance is composed of a lower or bottom receptacle-section 1, an upper receptacle-section 2, and a cover-plate 3. The receptacle-sections 1 and 2 are provided with the usual exterior vertical flanges 4, which form vertical recesses 5. The cover-plate 3 is provided with a plurality of notches 6 on the rim edge, which are positioned so as to register with the said vertical recesses 5 in the sections beneath. The usual bolts 7 have heads 8, which seat up against the bottom of the flanges on the bottom receptacle-section 1, and said bolts extend up through said recesses and also through the notches 6 in the cover-plate. Nuts 9 on the upper ends of the bolts secure the cover-plate and receptacle-sections together. While these features have been described, it is to be understood that the invention is applicable to flasks whose sections are secured together in various ways.

The exterior wall of the bottom receptacle-section 1 is provided with a laterally-projecting flange 10, which is preferably located at the side of one of the vertical flanges 4 and adjacent the horizontal upper edge of said section. This particular location of the horizontal flange is advantageous, as will be presently pointed out. The upper receptacle-section 2 is also provided with a lateral flange 11 at the side of the vertical flange 4, but adjacent its bottom edge and immediately over the flange 10 on the bottom section 1. These two flanges 10 and 11, while registering, are slightly separated from each other, so as to leave a space 12 between them. Both of these flanges 10 and 11 are provided with vertically-extending perforations 13, one of which is plainly seen in Fig. 3.

The cover-plate 3 has on the top a central lug 14, which is provided with a perforation 15, extending horizontally through it.

The tool which is to coact with the perforated flanges and lug is provided with a handle portion 21, having a bevel or taper 16 at one end and a wrench socket or perforation 17 at the other end. The walls of the socket are angular, so as to fit over a nut and form a wrench-head 18. Adjacent the wrench-head 18 this tool is provided with a V-pointed end 19, from which a pin 20 projects laterally or at right angles. In practice two of these tools may be employed with each flask.

In the operation after the receptacle-sections and cover have been secured together the pin 20 of the tool may be inserted in the perforation of the cover-lug 14, as seen in Fig. 1, and the flask suspended, so as to be placed within or removed from the vulcanizer. After the removal of the flask from the vulcanizer the pin 20 of one tool may be inserted in the perforation 13 from the bottom side of the flange 10 on the lower receptacle-section, as seen in Fig. 2. When thus inserted, the edge of the V-pointed end 19 of the tool will contact with the vertical flange 4, which will serve as a fulcrum-point, as indicated by broken lines in Fig. 3, to resist the twisting or turning action of the flask when the nuts 9 are being turned. When the pin 20 is thus inserted, the flask may be entirely supported by the tool, and another tool may be used as a wrench to engage and turn the nuts 9, as shown in Fig. 2. When the nuts and bolts have been removed, the receptacle-sections 1 and 2 will still cling together, and very often a hammer-blow must be resorted to in order to separate the sections. These hammer-blows against the flask are injurious to the latter, and in order to obviate this injury and enable the sections to be readily separated the space 12 has been provided between the horizontal flanges 10 and 11 on the adjacent sections, so that the beveled or tapered end 16 of the tool-handle may be inserted in said space to pry the two sections apart.

It will thus be seen that by means of my invention the flask may be easily placed within or removed from the vulcanizer, that the heated flask may be rigidly held while the nuts are turned, the flask parts may be readily separated, and that said parts may be separately handled by the aid of the tool, all without liability of burning the hands.

Having thus fully described my invention, what I claim as new, and desire to secure by Letters Patent, is—

1. A dental flask comprising one or more receptacle-sections and each section having laterally-projecting side flanges for the reception of a lifting-tool.

2. A dental flask having a laterally-projecting side flange provided with a perforation, and a cover-plate having a perforated lug projecting therefrom, said perforated side flange and perforated lug serving for the engagement of a lifting-tool.

3. A dental flask comprising a plurality of separable receptacle-sections and each of said sections adjacent their abutting edges having an exteriorly-projecting side flange for the reception of a lifting-tool, and the flange on one section being spaced from the flange on the next adjoining section for the reception of a prying-tool.

4. A dental flask comprising a plurality of receptacle-sections and each section having vertically-extending side flanges and a laterally-projecting perforated side flange adjacent said vertical side flange, as and for the purpose set forth.

In testimony whereof I affix my signature in the presence of two witnesses.

GEORGE L. BRUCE.

Witnesses:
CHARLES B. MANN, Jr.,
G. FERDINAND VOGT.